(12) United States Patent
Ma et al.

(10) Patent No.: US 8,780,822 B2
(45) Date of Patent: Jul. 15, 2014

(54) METHOD, APPARATUS AND SYSTEM FOR TRANSMITTING INFORMATION

(75) Inventors: Jie Ma, Shenzhen (CN); Bo Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 235 days.

(21) Appl. No.: 12/769,809

(22) Filed: Apr. 29, 2010

(65) Prior Publication Data

US 2010/0208688 A1 Aug. 19, 2010

Related U.S. Application Data

(63) Continuation of application No. PCT/CN2008/072841, filed on Oct. 27, 2008.

(30) Foreign Application Priority Data

Oct. 31, 2007 (CN) .......................... 2007 1 0124236

(51) Int. Cl.
*H04W 4/00* (2009.01)

(52) U.S. Cl.
USPC ........................................................ 370/329

(58) Field of Classification Search
USPC .................... 370/329, 336, 342; 455/437, 458
See application file for complete search history.

(56) References Cited

U.S. PATENT DOCUMENTS

| | | | |
|---|---|---|---|
| 6,757,293 B1 | 6/2004 | Chuah et al. | |
| 7,711,365 B2 * | 5/2010 | Nakamata | 455/437 |
| 7,797,012 B1 | 9/2010 | Longoni et al. | |
| 7,864,722 B2 | 1/2011 | Yi et al. | |
| 7,894,390 B2 * | 2/2011 | Nakamata et al. | 370/329 |
| 7,894,444 B2 | 2/2011 | Lohr et al. | |
| 2002/0045448 A1 | 4/2002 | Park | |
| 2003/0016698 A1 | 1/2003 | Chang et al. | |
| 2003/0223360 A1 | 12/2003 | Yamazaki | |
| 2004/0017789 A1 * | 1/2004 | Hoynck et al. | 370/329 |

(Continued)

FOREIGN PATENT DOCUMENTS

| | | |
|---|---|---|
| CN | 1451251 A | 10/2003 |
| CN | 1472901 A | 2/2004 |

(Continued)

OTHER PUBLICATIONS

Written Opinion of the International Searching Authority (translation) dated (mailed) Feb. 5, 2009, issued in related Application No. PCT/CN2008/072841, filed Oct. 27, 2008, Huawei Technologies Co., Ltd.

Written Opinion of the International Searching Authority (translation) dated (mailed) Feb. 5, 2009, issued in related Application No. PCT/CN2008/072796, filed Oct. 23, 2008, Huawei Technologies Co., Ltd.

International Search Report for International Application No. PCT/EP2005052275, mailed Nov. 11, 2005 Huawei Technologies Co., Ltd.

(Continued)

*Primary Examiner* — Mark Rinehart
*Assistant Examiner* — Gbemileke Onamuti
(74) *Attorney, Agent, or Firm* — Slater & Matsil, L.L.P.

(57) ABSTRACT

A method for transmitting information includes: by a NodeB, receiving a message for setting up/reconfiguring a shared Enhanced Dedicated Channel (E-DCH) transmission channel from a Radio Network Controller (RNC); and setting up the shared E-DCH transmission channel according to parameters in the message, and exchanging information with the RNC through an established shared E-DCH transmission bearer. A system and NodeB for transmitting information are also provided. With the present invention, the NodeB and the RNC can share the E-DCH transmission bearer, thus saving the channel resources between the NodeB and the RNC while speeding up the information transmission between the RNC and the NodeB.

16 Claims, 2 Drawing Sheets

---

101

The RNC sends a message for setting up/reconfiguring a shared E-DCH transmission channel to the NodeB, wherein the message from the RNC to the NodeB comprises the following parameters that are needed when a UE performs a random access through the shared E-DCH: a signature list, a relevant physical-layer parameter, and a transmission bearer parameter, and the signature list is sent from the RNC to the NodeB in a same manner as sending a preamble signature in a physical random access channel (PRACH)

↓ 102

The NodeB sets up the shared E-DCH transmission channel according to the parameters in the received message, and exchanges information with the RNC through an established shared E-DCH transmission bearer

(56) References Cited

U.S. PATENT DOCUMENTS

| | | | |
|---|---|---|---|
| 2004/0160925 A1 | 8/2004 | Heo et al. | |
| 2005/0053035 A1 | 3/2005 | Kwak et al. | |
| 2005/0063347 A1 | 3/2005 | Sarkkinen et al. | |
| 2005/0254511 A1 | 11/2005 | Kekki | |
| 2006/0019671 A1 | 1/2006 | Chemiakina | |
| 2006/0114877 A1 | 6/2006 | Heo et al. | |
| 2006/0156184 A1 | 7/2006 | Kim et al. | |
| 2006/0223567 A1 | 10/2006 | Kwak et al. | |
| 2007/0010270 A1 | 1/2007 | Dillon | |
| 2007/0042785 A1 | 2/2007 | Nakamata | |
| 2007/0047486 A1* | 3/2007 | Lee et al. | 370/329 |
| 2007/0140123 A1 | 6/2007 | Fukui | |
| 2007/0258402 A1 | 11/2007 | Nakamata et al. | |
| 2008/0085719 A1 | 4/2008 | Kuchibhotla | |
| 2008/0108311 A1 | 5/2008 | Shindo | |
| 2008/0123585 A1 | 5/2008 | Granzow et al. | |
| 2008/0182594 A1* | 7/2008 | Flore et al. | 455/458 |
| 2008/0253300 A1 | 10/2008 | Wakabayashi et al. | |
| 2008/0273610 A1 | 11/2008 | Malladi et al. | |
| 2008/0311923 A1 | 12/2008 | Petrovic | |
| 2009/0022134 A1* | 1/2009 | Chun et al. | 370/342 |
| 2009/0088185 A1 | 4/2009 | Beale | |
| 2009/0135771 A1 | 5/2009 | Pani | |
| 2009/0185540 A1* | 7/2009 | Pelletier et al. | 370/336 |
| 2009/0268676 A1 | 10/2009 | Wigard et al. | |
| 2012/0069811 A1* | 3/2012 | Ma et al. | 370/329 |

FOREIGN PATENT DOCUMENTS

| | | |
|---|---|---|
| CN | 1534915 A | 10/2004 |
| CN | 1943144 A | 4/2005 |
| CN | 1627844 A | 6/2005 |
| CN | 1645961 A | 7/2005 |
| CN | 1790971 A | 6/2006 |
| CN | 1867161 A | 11/2006 |
| CN | 1889534 A | 1/2007 |
| CN | 101006688 A | 7/2007 |
| CN | 101030810 A | 9/2007 |
| CN | 101031094 A | 9/2007 |
| CN | 101203048 A | 6/2008 |
| CN | 101426254 B | 5/2009 |
| EP | 1689127 A1 | 8/2006 |
| EP | 1737262 A1 | 12/2006 |
| EP | 1755355 A1 | 2/2007 |
| EP | 1 796 335 A1 | 6/2007 |
| EP | 1 838 057 A2 | 9/2007 |
| EP | 1841265 A2 | 10/2007 |
| EP | 2207276 A1 | 7/2010 |
| WO | WO 01/72080 A1 | 9/2001 |
| WO | WO2004/028041 A1 | 4/2004 |
| WO | WO2006/081874 A1 | 8/2006 |
| WO | WO2007/003707 A1 | 1/2007 |
| WO | WO 2007/073683 A1 | 7/2007 |
| WO | 2009055536 A2 | 4/2009 |
| WO | WO2009/059518 A1 | 5/2009 |
| WO | WO 2009/059518 A1 | 5/2009 |

OTHER PUBLICATIONS

"Discussion on RACH Enhancements," XP-002519687 3GPP TSG-RAN WG#59bis, Oct. 2007.
Extended European Search Report dated (mailed) Mar. 3, 2011, issued in related Application No. 08848009.0-1525, PCT/CN20080727969, Hauwei Technologies Co., Ltd.
"Universal Mobile Telecommunications System (UMTS); UTRAN lub interface Node B Application Part (NBAP) signaling" ETSI (3GPP TS 125 433 version 6.13.0 Release 6, Mar. 2007.
First Chinese Office Action dated (mailed) Nov. 13, 2009, issued in related Chinese Application No. 200710124235.1 Huawei Technologies Co., Ltd.
Re-Examination Decision mailed Jul. 21, 2011, issued in related Chinese Application No. 200710124235.1, Huawei Technologies Co., Ltd., 12 pages.
First U.S. Office Action dated Sep. 23, 2011, issued in related U.S. Appl. No. 12/771,863, Huawei Technologies Co., Ltd., 15 pages.
First U.S. Office Action dated Sep. 22, 2011, issued in related U.S. Appl. No. 13/114,209, Huawei Technologies Co., Ltd., 10 pages.
XP-002519687, 3GPP TSG-RAN WG2 #59bis, "Discussion on RACH enhancements," Oct. 2007.
3GPP TS 25.433 V7.6.0, Technical Specification Group Radio Access Network; "UTRAN lub interface Node B Application Part (NBAP) signaling," Sep. 2007.
Rejected Decision of Chinese Patent Application No. 200710124235.1 (partial translation); and Chinese version, mailed Jun. 12, 2010 (8 pgs.).
3GPP, "3rd Generation Partnership Project; Technical Specification Group Radio Access Network; 1.28. Mcps TDD Enhanced Uplink; Physical Layer Aspects (Release 7)", 3GPP TR 25.827, V7.0.0, pp. 1-31, (Mar. 2007).
NSN, Nokia, "Further discussion on enhanced CELL_FACH in REL8", 3GPP TSG-RAN WG2 Meeting #59, R2-073254, pp. 1-3, (Aug. 20-24, 2007).
NSN, Nokia, "Enhanced CELL_FACH state with E-DCH", 3GPP TSG-RAN WG3 Meeting #57bis, R3-071927, pp. 1-2, (Oct. 8-11, 2007).
International Search Report from P.R. China in International Application No. PCT/CN2008/072841 mailed Feb. 5, 2009.
US Office Action of dated Apr. 18, 2012, issued in related U.S. Appl. No. 13/114,209, Jie MA, Huawei Technologies Co., Ltd.
3GPP Ts 23.401 V1.0.0, 3rd Generation Partnership Project; Technical Specification Group Services and System Aspects; GPRS enhancements for E-UTRAN access, (Release 8), May 5, 2007.
Notice of Reasons for Rejection, dated (mailed) Jan. 24, 2012 in related Japanese Application No. 2010-517260, Huawei Technologies Co., Ltd.
3GPP TSG SA WG2 (Temporary Document); dated Nov. 12-16, 2007; TD S2-075726 (rev of S2-075648; rev of S2-074896); Source: Vodafone; Title: Global Unique Temporary Identities; Document for: Approval; Agenda Item: 8.2.9/8.2.8; Work Item / Release: SEAS/Rel-8; (4 pgs.).
3GPP TSG SA WG2 Meeting #59 (Temporary Document); dated Aug. 27-31, 2007; Helsinki, Finland; S2-073255; Source: China Mobile, Huawei; Title: Discussion on the structure of S-TMSI; Document for: Discussion and Approval; Agenda Item: 8.2.2/8.2.7; Work Item / Release: SAE; (3 pgs.).
Final Office Action mailed Jul. 30, 2012, issued in related U.S. Appl. No. 13/305,138 (29 pages).
Office action issued in corresponding to U.S. Appl. No. 13/114,209,dated Nov. 14, 2012,total 12 pages.
US Office Action dated Sep. 22, 2011, issued in related U.S. Appl. No. 13/114,209, Jie MA, Huawei Technologies Co., Ltd.
US Office Action dated Sep. 23, 2011, issued in related U.S. Appl. No. 12/771,863, Jie MA, Huawei Technologies Co., Ltd.
US Office Action dated Sep. 16, 2011, issued in related U.S. Appl. No. 13/305,138, Jie MA, Huawei Technologies Co., Ltd.
Final Office Action mailed Jun. 27, 2012, issued in related U.S. Appl. No. 12/771,863 (18 pages).
Office action issued in corresponding to U.S. Appl. No. 13/114,209,dated May 31, 2013,total 16 pages.
Search report issued in corresponding European application No. 08848301.1,dated Jun. 16, 2013,total 10 pages.
3GPP TSG-RAN WG2 Meeting#59bis R2-074010,"Enhanced Random Access with E-DCH",NSN,Nokia,Oct. 2007,total 2 pages.
3GPP TSG-RAN WG2 Meeting#60 R3-081424,"On Resource Allocation",Nokia Siemens Networks,Nokia,May 2008, total 2 pages.
3GPP TS 25.427 V7.5.0,3rd Generation Partnership Project;Technical Specification Group Radio Access Network; UTRAN lub/lur interface user plane protocol for DCH data streams(Release 7),Sep. 2007,total 44 pages.
Office action issued in corresponding European application No. 08848009.0,dated Sep. 9, 2013,total 7 pages.
Chinese Office Action and Search Report in Chinese Application No. 201210020408.6, mailed Feb. 11, 2014, 7 pages.

* cited by examiner

METHOD, APPARATUS AND SYSTEM FOR TRANSMITTING INFORMATION

CROSS-REFERENCE TO RELATED APPLICATIONS

This application is a continuation of International Application No PCT/CN2008/072841, filed on Oct. 27, 2008, which claims priority to Chinese Patent Application No. 200710124236.6, filed on Oct. 31, 2007, both of which are hereby incorporated by reference in their entireties.

FIELD OF THE INVENTION

The present invention relates to mobile communication technologies, and in particular, to a method, apparatus, and system for transmitting information.

BACKGROUND OF THE INVENTION

A mobile communication system includes a User Equipment (UE), a base station, and a radio network control device. For ease of description, it is assumed that the base station is a NodeB of Universal Mobile Telecommunications System, and that the radio network control device is a Radio Network Controller (RNC) hereunder. The channel between the UE and the NodeB and the channel between the NodeB and the RNC are Random Access Channels (RACHs).

To enhance the data transmission rate between the UE and the NodeB, a solution is put forward in the industry: using High Speed Downlink Packet Access (HSDPA) in the downlink common channel, thus making the theoretical downlink transmission rate as high as 100 Kbps. However, the downlink transmission rate is affected by the uplink transmission rate. For example, uplink transmission is currently performed on a shared RACH, which leads to slow uplink response and affects the downlink transmission rate.

To solve the problem, another solution is put forward in the industry: using High Speed Uplink Packet Access (HSUPA) to implement random access. This solution requires the UE to use an Enhanced Dedicated Channel (E-DCH) transmission channel to transmit the specific messages in the uplink transmission at random access. That is, an E-DCH should be used between the UE and the NodeB. This solution increases the speed of exchanging information between the UE and the NodeB massively.

During implementing of the present invention, the inventor finds at least the following problems in the prior art:

To increase the speed of transmitting the data sent by the UE in the uplink direction between the RNC and the NodeB, an E-DCH transmission channel may also be used between the RNC and the NodeB. Because the UE data quantity is small and intermittent, if a dedicated E-DCH channel is used between the RNC and the NodeB, resources are wasted drastically.

The channel between the RNC and the NodeB is port-based. This channel is different from the air interface based channel between the UE and the NodeB, and the method for allocating an E-DCH transmission channel between the UE and the NodeB at random access is not applicable to allocation of the channel between the RNC and the NodeB.

SUMMARY OF THE INVENTION

The embodiments of the present invention provide a method for transmitting information to save the channel resources between the RNC and the NodeB while speeding up the information transmission between the RNC and the NodeB. In addition, the embodiments of the present invention provide an apparatus and system for transmitting information.

The objectives of the present invention are fulfilled through the following technical solution.

A method for transmitting information is provided in an embodiment of the present invention. The method includes:

receiving, by a NodeB, a message for setting up/reconfiguring a shared Enhanced Dedicated Channel (E-DCH) transmission channel from a Radio Network Controller (RNC); and setting up, by the NodeB, the shared E-DCH transmission channel according to parameters in the message, and exchanging information with the RNC through an established shared E-DCH transmission bearer.

A system for transmitting information is provided in an embodiment of the present invention.

An RNC in the system is configured to send a message for setting up/reconfiguring a shared E-DCH transmission channel to a NodeB.

The NodeB in the system is configured to set up the shared E-DCH transmission channel according to the setup/reconfiguration message sent by the RNC, and exchange information with the RNC through an established shared E-DCH transmission bearer.

A NodeB for transmitting information is provided in an embodiment of the present invention.

The NodeB is configured to: receive a message for setting up/reconfiguring a shared E-DCH transmission channel from an RNC, set up the shared E-DCH transmission channel according to the parameters in the message, and exchange information with the RNC through the an established E-DCH transmission bearer.

Compared with the prior art, the embodiments of the present invention use the NodeB to receive the message for setting up/reconfiguring a shared E-DCH transmission channel from the RNC, and set up the shared E-DCH transmission channel based on the message. Afterward, through the shared E-DCH transmission channel, the NodeB exchanges information with the RNC. Therefore, the NodeB and the RNC can share the E-DCH transmission bearer, thus saving the channel resources between the NodeB and the RNC while speeding up the information transmission between the RNC and the NodeB.

DETAILED DESCRIPTION OF THE EMBODIMENTS

To make the technical solution, objectives and merits of the present invention clearer, the following describes the embodiments of the present invention in detail with reference to some accompanying drawings.

Figure 1:
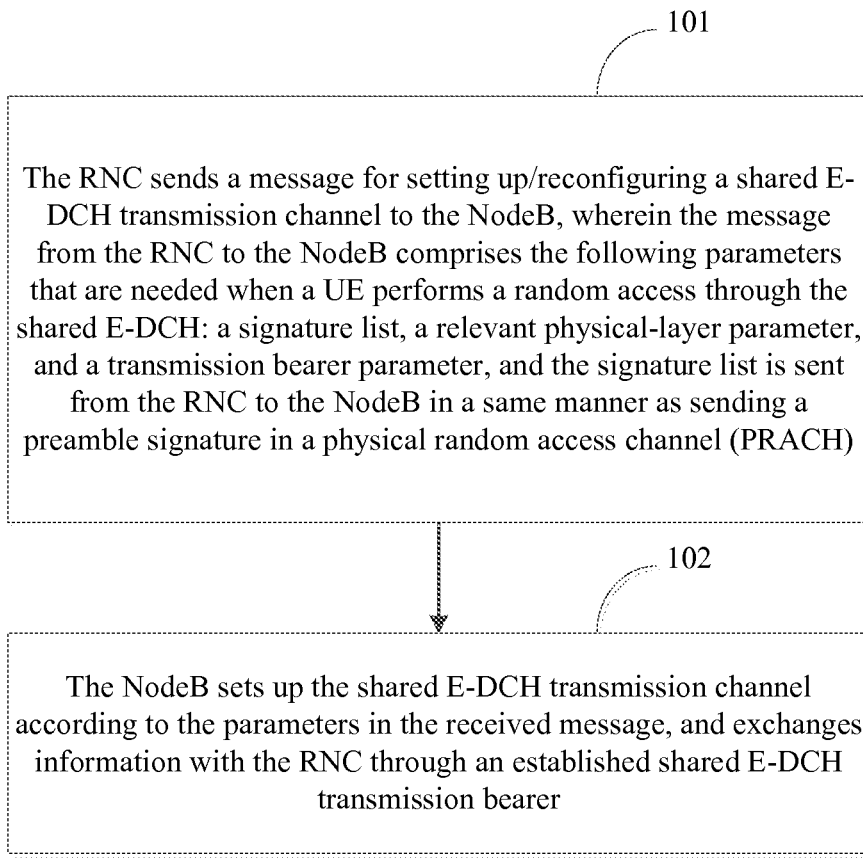
FIG. 1 is a sequence diagram of configuring a shared E-DCH transmission channel between an RNC and a NodeB according to an embodiment of the present invention.

As shown in FIG. 1, the process of configuring a shared E-DCH transmission channel between an RNC and a NodeB according to an embodiment of the present invention includes the following content.

Step 101: The RNC sends a message for setting up/reconfiguring a shared E-DCH transmission channel to the NodeB, requesting the NodeB to set up an E-DCH transmission channel.

It is assumed herein that the setup/reconfiguration message sent by the RNC to the NodeB is a setup/reconfiguration request.

The RNC needs to send a request to the NodeB, notifying the parameters required for channel setup/reconfiguration. For example, the parameters may include: the signature list and/or the relevant physical layer channel parameters used when the UE performs random access through the E-DCH, and/or the relevant physical layer channel parameters; and the parameters may further include one or more of these parameters: the physical layer parameters required when the UE performs random access through the E-DCH, transmission channel parameters required when the UE performs random access through the E-DCH, or transmission bearer parameters required when the UE performs random access through the E-DCH, or may further include one or all of the above two types of parameters. The parameters may be sent through a new message; or the parameters are added into a message of the existing process, which means the parameters are sent through the existing process.

If the RNC sends the signature list used when the UE performs random access through the E-DCH to the NodeB, the RNC may send the signature list in many modes. This embodiment provides several modes: (1) A table is stipulated in the protocol, and a serial number of the table is assigned and sent; or (2) a signature sequence is configured and sent; or (3) the signature list is sent in the mode like Preamble Signatures in the traditional Physical Random Access Channel (PRACH). These sending modes may be performed in the process of setting up the common transmission channel.

If the RNC sends the physical layer channel parameters required when the UE performs random access through the E-DCH to the NodeB, the RNC may send the parameters in many modes. This embodiment provides the specific processing modes for the RNC to notify the NodeB to assign the relevant resources through configuration of the channel such as the Arrest Indication Channel (AICH), High Speed-DSCH-related Shared Control Channel (HS-SCCH), and High Speed Physical Downlink Shared Channel (HS-PDSCH). The detailed modes are as follows:

(1) An Arrest Indication (AI) is added into an AICH sent to the NodeB, indicating that the AICH may be used at the time of performing random access through the E-DCH. In this case, the AICH may be modified in the common transmission setup process.

(2) The second mode is specific to the HS-SCCH. In this mode, the HS-SCCH sent to the NodeB may carry at least one of these items: physical-layer parameters, HS-SCCH format number, and HS-SCCH time sequence relation. In this case, the HS-SCCH may be modified in the process of reconfiguring the physical shared channel. The physical-layer parameters may be channelized codes and power. The power may be the maximum transmit power and/or initial transmit power; for the HS-SCCH format number, the current HS-SCCH comes in three formats, and the specific format needs to be indicated; the HS-SCCH time sequence relation may be a contrast between the HS-SCCH and an absolute time sequence, for example, an offset from the AICH or Primary Common Control Physical Channel (P-CCPCH), measured in timeslots or 256 chips.

(3) The third mode is specific to the HS-PDSCH. In this mode, the HS-PDSCH sent to the NodeB may be added at least one of these items: physical-layer parameters, HS-PD-SCH time sequence relation, and transmission channel parameters. In this mode, the HS-PDSCH may be modified in the process of setting up the common transmission channel. Besides, the physical-layer parameters may include at least one of these items: channelized code, modulation mode, power, and TB size; the HS-PDSCH time sequence relation may be a contrast between an HS-PDSCH and an absolute time sequence, for example, an offset from an AICH or P-CCPCH, measured in timeslots or 256 chips; the transmission channel parameters include an indication of the MAC format, specifically including MAC-hs, MAC-ehs in DPA enhancement, or a newly defined format.

If the RNC sends the relevant E-DCH physical-layer parameters required when the UE performs random access through the E-DCH, transmission channel parameters required when the UE performs random access through the E-DCH, and the transmission bearer parameters required when the UE performs random access through the E-DCH, etc, to the NodeB, the RNC may send the parameters in many modes as the same.

The E-DCH physical-layer parameters may include the parameters in the following Table 1, and such parameters may be added in the process of setting up the common transmission channel.

TABLE 1

E-DPCH Information
>Maximum Set of E-DPDCHs
>Puncture Limit
>E-TFCS Information
>E-TTI
>E-DPCCH Power Offset
>HARQ Info for E-DCH
E-DCH FDD Information
F-DPCH Information
>Power Offset Information
>>PO2
>FDD TPC DL Step Size
>Limited Power Increase
>Inner Loop DL PC Status The transmission channel parameters may include the parameters in the following Table 2. Specifically, an indication may be added into the shared physical channel reconfiguration to indicate that the parameters can be used at the time of performing random access through the E-DCH. Alternatively, the parameters are directly added into the process of setting up the common transmission channel.

TABLE 2

E-AGCH And E-RGCH/E-HICH FDD Scrambling Code
E-AGCH Code FDD Information
E-RGCH/E-HICH Code FDD Information The transmission bearer may include the optional parameters in the following Table 3. These optional parameters may be added in the process of setting up the common transmission channel.

TABLE 3

| IE/Group Name | Presence | Range | IE Type and Reference | Semantics Description |
|---|---|---|---|---|
| RL Specific E-DCH Information | | 1 ... <maxnoofEDCHMACdFlows> | | |
| >Binding ID | O | | 9.2.1.4 | Shall be ignored if bearer establishment with ALCAP. |
| >Transport Layer Address | O | | 9.2.1.63 | Shall be ignored if bearer establishment with ALCAP. |
| >>>>Common Transport Channel ID | O | | 9.2.1.14 | |
| >>>>Transport Format Set | O | | 9.2.1.59 | For the UL. |
| >>>>TNL QoS | O | | 9.2.1.58A | Shall be ignored if bearer establishment with ALCAP. |
| E-AGCH Power Offset | O | | 9.2.2.13Id | |
| E-RGCH Power Offset | O | | 9.2.2.13Ie | |
| E-HICH Power Offset | O | | 9.2.2.13If | |

Step 102: The NodeB sets up the shared E-DCH transmission channel according to parameters in the received message, and exchanges information with the RNC through an established shared E-DCH transmission bearer.

The NodeB may return a channel setup/reconfiguration response to the RNC, notifying the information about the established E-DCH transmission channel.

The NodeB sets up the corresponding shared E-DCH transmission channel according to the parameters sent by the RNC, and returns the information about the established channel to the RNC. Specifically, the transmission-layer address and/or Binding ID is notified to the RNC. Alternatively, other relevant parameters of the E-DCH transmission channel may be notified to the RNC.

Moreover, after the shared E-DCH transmission channel is set up, if the NodeB needs to send UE information to the RNC, the UE ID needs to be notified to the RNC. Specifically, after receiving the information sent by the UE, the NodeB also needs to add the UE ID into the received information, with a view to modifying the data to new E-DCH data, or with a view to modifying the E-DCH FP frame corresponding to the data to the FP frame that carries the UE ID.

The modified FP frame is shown in the following Table 4.

TABLE 4

| | |
|---|---|
| Header crc | FT |
| Header CRC cont | FSN |
| Spare | Numbers of subframe |
| | CFN |
| | UEid1 |
| | UEid1 |
| | Ueid 2 |
| | Ueid 2 |
| | Ueid n |
| | Ueid n |
| Ue 1       Nof HARQ Retransm | 1st subframe No. |
| N of MAC-es PDUs | First DDI |
| First DDI | First N |
| Last DDI | Last N |
| Last N cont | PAd |
| Ue 1       Nof HARQ Retransm | Last subframe No. |
| N of MAC-es PDUs | First DDI |
| First DDI | First N |
| Last DDI | Last N |
| Last N cont | PAd |
| Ue 1       Nof HARQ Retransm | Last subframe No. |
| N of MAC-es PDUs | First DDI |
| First DDI | First N |
| Last DDI | Last N |

TABLE 4-continued

| | |
|---|---|
| Last N cont | PAd |
| | New IE flag |
| | First MAC-es PDU of 1st subframe of UE1 |
| | Last MAC-es PDU of Last subframe of UE1 |
| | Last MAC-es PDU of Last subframe of UEn |
| | Payload CRC |
| | Payload CRC cont |

In the foregoing solution which uses a shared E-DCH transmission channel to transmit data to the RNC, it is necessary to modify the processing logic of the RNC so that the RNC can resolve the UE ID. Specifically, the MAC-es entity may be modified accordingly. Nevertheless, the modification is based on the precondition that the entity corresponding to the resolved UE ID in the RNC is a MAC-es entity. If the entity corresponding to the UE ID is another entity, the entity needs to be modified accordingly.

The foregoing embodiment reveals that: Random access can also be performed between the RNC and the NodeB through an E-DCH, thus saving the channel resources between the RNC and the NodeB.

Figure 2:
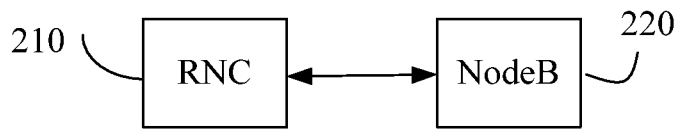
FIG. 2 shows a structure of a system according to an embodiment of the present invention.
Figure 3:
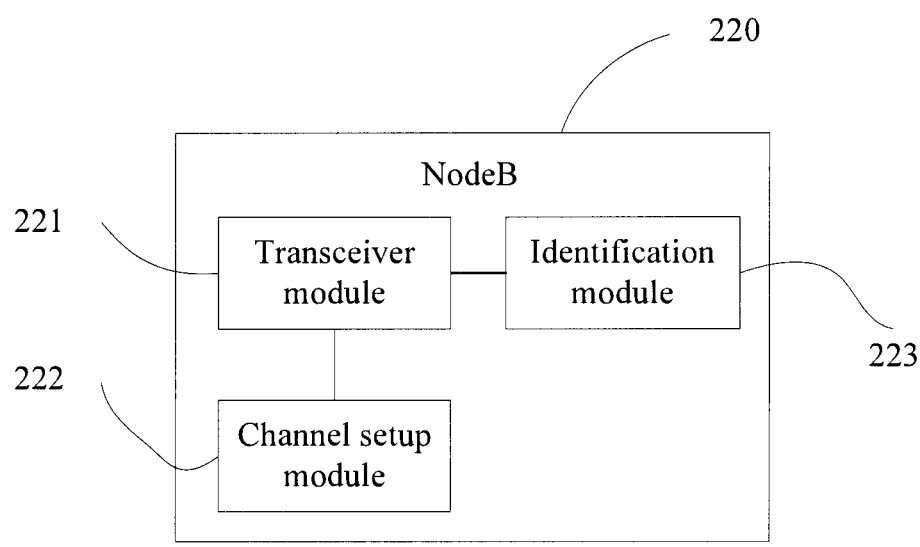
FIG. 3 shows a structure of a NodeB according to an embodiment of the present invention.

As shown in FIG. 2, the system provided in an embodiment of the present invention includes an RNC 210 and a NodeB 220.

The RNC 210 needs to send a message for setting up/reconfiguring a shared E-DCH transmission channel to the NodeB 220.

The NodeB 220 needs to set up the shared E-DCH transmission channel according to parameters in the message, and exchange information with the RNC through an established shared E-DCH transmission bearer.

The NodeB 220 is further configured to return the information about the established shared E-DCH transmission channel to the RNC 210.

Afterward, information may be transmitted between the NodeB 220 and the RNC 210 through the established shared E-DCH transmission bearer.

When the RNC 210 sends the setup/reconfiguration request, the setup/reconfiguration request sent by the RNC 210 may carry a signature list used when the UE performs random access through the E-DCH, relevant physical-layer channel parameters required when the UE performs random access through the E-DCH, relevant physical-layer parameters required when the UE performs random access through the E-DCH, transmission channel parameters, or transmission bearer parameters, or any combination thereof.

The RNC 210 sends a setup/reconfiguration request and returns the information about the established shared E-DCH transmission channel to the NodeB 220, which is detailed above and not described further.

After the shared E-DCH transmission bearer channel is set up, if the NodeB 220 needs to send UE information to the RNC 210, the UE ID needs to be notified to the RNC 210. Specifically, after receiving the information sent by the UE, the NodeB 220 also needs to add the UE ID into the received information, with a view to modifying the data to new E-DCH data, or with a view to modifying the E-DCH FP frame corresponding to the data to the FP frame that carries the UE ID.

Accordingly, the RNC 210 needs to resolve the received information to obtain the UE ID. For example, for the new E-DCH data and E-DCH FP frame, the MAC-es entity in the RNC 210 needs to be modified. The implementation is detailed above, and is not described further.

The foregoing method and system embodiments reveal that: In the apparatus embodiment herein, the NodeB 220 needs to set up a shared E-DCH transmission channel according to the parameters in the message sent by the RNC 220, and may be further configured to return a channel setup/reconfiguration response to the RNC 210 to indicate the information about the established shared E-DCH transmission channel.

Accordingly, the RNC 210 needs to send a request for setting up/reconfiguring a shared E-DCH transmission channel to the NodeB 220.

After the shared E-DCH transmission channel is set up between the NodeB 220 and the RNC 210, the NodeB 220 may be further configured to: add an UE ID into the information transmitted by the UE through the shared E-DCH transmission channel and convert the data in the information into the E-DCH data that carries the UE ID, or convert the information into an FP frame that carries the UE ID, and send the modified information to the RNC 210 through the shared E-DCH transmission bearer.

Specifically, the NodeB 220 for transmitting information may include:

a transceiver module 221, configured to receive a message for setting up/reconfiguring a shared E-DCH transmission channel from the RNC 210; and a channel setup module 222, configured to: set up the shared E-DCH transmission channel according to parameters in the message, and control the transceiver module 221 to exchange information with the RNC 210 through an established shared E-DCH transmission bearer.

The NodeB may further include:

an identification module 223, configured to: add a UE ID into the information received from the UE, modify the data in the information to new E-DCH data, or modify the E-DCH FP frame corresponding to the data to the FP frame that carries the UE ID, and control the transceiver module 221 to send the modified information to the RNC 210 through the shared E-DCH transmission channel.

The foregoing embodiment reveals that: Random access may also be performed between the RNC and the NodeB through an E-DCH, thus saving the channel resources between the RNC and the NodeB.

The NodeB and RNC in the embodiments of the present invention may be replaced with other devices of equivalent functions, which also falls within the scope of protection of the present invention Based on the descriptions of the preceding embodiments, those skilled in the art may understand that the present invention may be implemented by hardware only or by software and a necessary universal hardware platform. The technical solution of the present invention may be embodied by a software product which may be stored in a nonvolatile storage medium. The storage medium can be a Compact Disk Read-Only Memory (CD-ROM), a USB disk, or a mobile hard disk. The software product includes a number of instructions that enable a computer device (personal computer, server, or network device) to execute the methods provided in the embodiments of the present invention.

The above descriptions are merely some exemplary embodiments of the present invention, but not intended to limit the scope of the present invention. Any modification, equivalent replacement, or improvement made without departing from the spirit and principle of the present invention should fall within the scope of the present invention.

What is claimed is:

1. A method for transmitting information, comprising:
    sending, by a radio network controller (RNC), a message for setting up or reconfiguring a shared enhanced dedicated channel (shared E-DCH) to a NodeB;
    receiving, by the RNC, information from the NodeB about the shared E-DCH that the NodeB set up or reconfigured according to the message from the RNC to the NodeB;
    exchanging, by the RNC, information with the NodeB through the shared E-DCH;
    wherein the message from the RNC to the NodeB comprises the following parameters that are needed when a user equipment (UE) performs a random access procedure through the shared E-DCH: a signature list, a relevant physical layer parameter, and a transmission bearer parameter;
    and wherein the signature list is sent from the RNC to the NodeB in a same manner as sending a preamble signature in a physical random access channel (PRACH);
    and wherein the exchanging information with the NodeB through the shared E-DCH comprises:
    receiving, by the RNC, E-DCH data including a UE identity (ID) from the NodeB, and
    resolving, by the RNC, the E-DCH data received including the UE ID to obtain the UE ID; wherein the E-DCH data including the UE ID is obtained by adding, by the NodeB, the UE ID of a UE into information received from the UE and converting, by the NodeB, data and the UE ID in the information into the E-DCH data including the UE ID, wherein the information received from the UE does not include any UE ID.

2. The method of claim 1, wherein the information received from the NodeB comprises at least one of a transmission layer address and a binding identification (ID).

3. The method of claim 1, wherein the relevant physical layer parameter comprises:
    E-DPCH (enhanced dedicated physical channel) information,
    E-DCH FDD (enhanced dedicated channel frequency division duplex) Information, and
    F-DPCH (fractional dedicated physical channel) Information.

4. The method of claim 3, wherein the E-DPCH information comprises the following items:
    a maximum set of an E-DPDCH (enhanced dedicated physical data channel),
    a puncture limit,
    E-TFCS (enhanced transport format combination set) Information, an E-TTI (enhanced transmission time interval),
an E-DPCCH (enhanced dedicated physical control channel) power offset, and
HARQ (hybrid automatic repeat request) information for the shared E-DCH.

5. The method of claim 1, wherein the transmission bearer parameter comprises the following items:
a binding identification (ID),
a transport layer address,
a common transport channel ID,
a transport format set, and
a TNL (transport network layer) QoS (quality of service).

6. The method of claim 1, wherein the parameters further comprise a relevant physical layer channel parameter; and
the relevant physical layer channel parameter is:
a format indication added in Arrest Indication Channel (AICH) information sent by the RNC to the NodeB.

7. The method of claim 1, wherein the parameters further comprise: a relevant physical layer channel parameter; and
the relevant physical layer channel parameter is:
at least one of these items: a physical layer parameter added in HS-SCCH information sent from the RNC to the NodeB, High Speed-DSCH-related Shared Control Channel (HS-SCCH) format number added in HS-SCCH information sent from the RNC to the NodeB, and HS-SCCH time sequence relation added in HS-SCCH information sent from the RNC to the NodeB.

8. The method of claim 1, wherein the parameters further comprise: a relevant physical layer channel parameter; and
the relevant physical layer channel parameter is:
at least one of these items: a physical layer parameter added in HS-PDSCH information sent by the RNC to the NodeB, High Speed Physical Downlink Shared Channel (HS-PDSCH) time sequence relation added in HS-PDSCH information sent by the RNC to the NodeB, and a transmission channel parameter added in HS-PDSCH information sent by the RNC to the NodeB.

9. A radio network controller (RNC), comprising:
a transmitter, configured to send a message for setting up or reconfiguring a shared enhanced dedicated channel (shared E-DCH) to a NodeB; and
a receiver, configured to receive information from the NodeB about the shared E-DCH that the NodeB set up or reconfigured according to the message from the RNC to the NodeB and receive E-DCH data including a UE identity (ID) from the NodeB;
a processor, configured to resolve the E-DCH data received including the UE ID to obtain the UE ID;
wherein the message from the RNC to the NodeB comprises the following parameters that are needed when a user equipment (UE) performs a random access procedure through the shared E-DCH: a signature list, a relevant physical layer parameter, and a transmission bearer parameter;
and wherein the signature list is sent from the RNC to the NodeB in a same manner as sending a preamble signature in a physical random access channel (PRACH);
and wherein the E-DCH data including the UE ID is obtained by adding, by the NodeB, the UE ID of a UE into information received from the UE and converting, by the NodeB, data and the UE ID in the information into the E-DCH data including the UE ID, wherein the information received from the UE does not include any UE ID.

10. The RNC of claim 9, wherein the information received from the NodeB comprises at least one of a transmission layer address and a binding identification (ID).

11. The RNC of claim 9, wherein the relevant physical layer parameter comprises:
E-DPCH (enhanced dedicated physical channel) information,
E-DCH FDD (enhanced dedicated channel frequency division duplex) Information, and
F-DPCH (fractional dedicated physical channel) Information.

12. The RNC of claim 11, wherein the E-DPCH information comprises the following items:
a maximum set of an E-DPDCH (enhanced dedicated physical data channel),
a puncture limit,
E-TFCS (enhanced transport format combination set) Information,
an E-TTI (enhanced transmission time interval),
an E-DPCCH (enhanced dedicated physical control channel) power offset, and
HARQ (hybrid automatic repeat request) information for the shared E-DCH.

13. The RNC of claim 9, wherein the transmission bearer parameter comprises the following items:
a binding identification (ID),
a transport layer address,
a common transport channel ID,
a transport format set, and
a TNL (transport network layer) QoS (quality of service).

14. The RNC of claim 9, wherein the parameters further comprise: a relevant physical layer channel parameter; and
the relevant physical layer channel parameter is:
a format indication added in Arrest Indication Channel (AICH) information sent by the RNC to the NodeB.

15. The RNC of claim 9, wherein the parameters further comprise: a relevant physical layer channel parameter; and
the relevant physical layer channel parameter is:
at least one of these items: a physical layer parameter added in HS-SCCH information sent from the RNC to the NodeB, High Speed-DSCH-related Shared Control Channel (HS-SCCH) format number added in HS-SCCH information sent from the RNC to the NodeB, and HS-SCCH time sequence relation added in HS-SCCH information sent from the RNC to the NodeB.

16. The RNC of claim 9, wherein the parameters further comprise: a relevant physical layer channel parameter; and
the relevant physical layer channel parameter is:
at least one of these items: a physical layer parameter added in HS-PDSCH information sent by the RNC to the NodeB, High Speed Physical Downlink Shared Channel (HS-PDSCH) time sequence relation added in HS-PDSCH information sent by the RNC to the NodeB, and a transmission channel parameter added in HS-PDSCH information sent by the RNC to the NodeB.

* * * * *